US 8,170,391 B2

(12) United States Patent
Beck (10) Patent No.: US 8,170,391 B2
(45) Date of Patent: May 1, 2012

(54) FIBER OPTIC STRAIN RELIEF ASSEMBLY

(75) Inventor: Ronald A. Beck, Naples, FL (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 238 days.

(21) Appl. No.: 12/704,248

(22) Filed: Feb. 11, 2010

(65) Prior Publication Data

US 2010/0209067 A1 Aug. 19, 2010

Related U.S. Application Data

(60) Provisional application No. 61/151,566, filed on Feb. 11, 2009.

(51) Int. Cl.
*G02B 6/00* (2006.01)
*G02B 6/36* (2006.01)

(52) U.S. Cl. ............. 385/136; 385/84; 385/85; 385/86; 385/87; 385/134; 385/135; 385/137

(58) Field of Classification Search ............... 385/84, 385/85, 86, 87, 134–137
See application file for complete search history.

(56) References Cited

U.S. PATENT DOCUMENTS

| | | | |
|---|---|---|---|
| 5,030,136 A | 7/1991 | Reinhardt et al. | |
| 5,397,859 A | 3/1995 | Robertson et al. | |
| 5,561,269 A | 10/1996 | Robertson et al. | |
| 6,416,348 B2 | 7/2002 | Hio et al. | |
| 6,572,399 B2 | 6/2003 | Shimirak | |
| 7,397,997 B2 | 7/2008 | Ferris et al. | |
| 7,477,824 B2 | 1/2009 | Reagan et al. | |
| 7,477,826 B2 | 1/2009 | Mullaney et al. | |
| 7,512,304 B2 | 3/2009 | Gronvall et al. | |
| 7,603,018 B2 | 10/2009 | Mullaney et al. | |
| 2008/0273854 A1* | 11/2008 | Hendrickson et al. | 385/135 |

FOREIGN PATENT DOCUMENTS

DE 296 05 927 U1 8/1996
* cited by examiner

*Primary Examiner* — Brian M. Healy
*Assistant Examiner* — Hung Lam
(74) *Attorney, Agent, or Firm* — Merchant & Gould P.C.

(57) ABSTRACT

A fiber optic strain relief assembly includes a housing having a first end and an oppositely disposed second end. The housing defines a bore that extends between the first end and the second end. The fiber optic strain relief assembly further includes a strain relief plate disposed in the bore of the housing. The strain relief plate includes a retention portion that is adapted to receive a strength member of a fiber optic cable. The retention portion includes a plurality of gripping tabs adapted to engage an outer surface of the strength member.

22 Claims, 6 Drawing Sheets

FIBER OPTIC STRAIN RELIEF ASSEMBLY

CROSS REFERENCE TO RELATED APPLICATIONS

The present application claims priority to U.S. Provisional Patent Application Ser. No. 61/151,566, filed Feb. 11, 2009 and entitled "Fiber Optic Strain Relief Assembly," which is hereby incorporated by reference in its entirety.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and/or cost and may increase network reliability.

Fiber optic cables are used in fiber optic networks to establish fiber optic connections between end subscribers and a central office. In these fiber optic networks, fiber optic cables are often engaged to other fiber optic cables at connection locations (e.g., fiber distribution hubs, drop terminals, fiber optic enclosures, adapter housings, connector housings, etc.). At some of these connection locations, cable clamps are used to secure the fiber optic cable to the connection location. In some applications, however, cable clamps are not advantageous. Therefore, there exists a need for an alternate securing mechanism that secures fiber optic cables to connection locations.

SUMMARY

An aspect of the present disclosure relates to a fiber optic strain relief assembly. The fiber optic strain relief assembly having a housing having a first end and an oppositely disposed second end. The housing defines a bore that extends between the first end and the second end. The fiber optic strain relief assembly further includes a strain relief plate disposed in the bore of the housing. The strain relief plate includes a retention portion that is adapted to receive a strength member of a fiber optic cable. The retention portion includes a plurality of gripping tabs adapted to engage an outer surface of the strength member.

Another aspect of the present disclosure relates to a fiber optic strain relief assembly. The fiber optic strain relief assembly includes a fiber optic cable having a first strength member and a second strength member. The fiber optic strain relief assembly further includes a housing having a first end and an oppositely disposed second end. The housing defines a bore that extends between the first end and the second end. The first end receives an end of the fiber optic cable. A strain relief plate is disposed in the bore of the housing. The strain relief plate includes a first retention portion and a second retention portion. Each of the first and second retention portions includes a plurality of gripping tabs that defines a central opening. Each of the central openings is adapted to receive one of the first and second strength members of the fiber optic cable. The strain relief plate further includes a cable pass-thru portion disposed between the first and second retention portions. The cable pass-thru portion is adapted to receive an optical fiber of the fiber optic cable.

Another aspect of the present disclosure relates to a method for inserting a fiber optic cable into a fiber optic strain relief assembly. The method includes stripping an outer jacket of a fiber optic cable from an end of the fiber optic cable. The method further includes inserting a strength member of the fiber optic cable through a first end of a housing of a fiber optic strain relief assembly and inserting the strength member through an opening of a retention portion of a strain relief plate of the fiber optic strain relief assembly.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
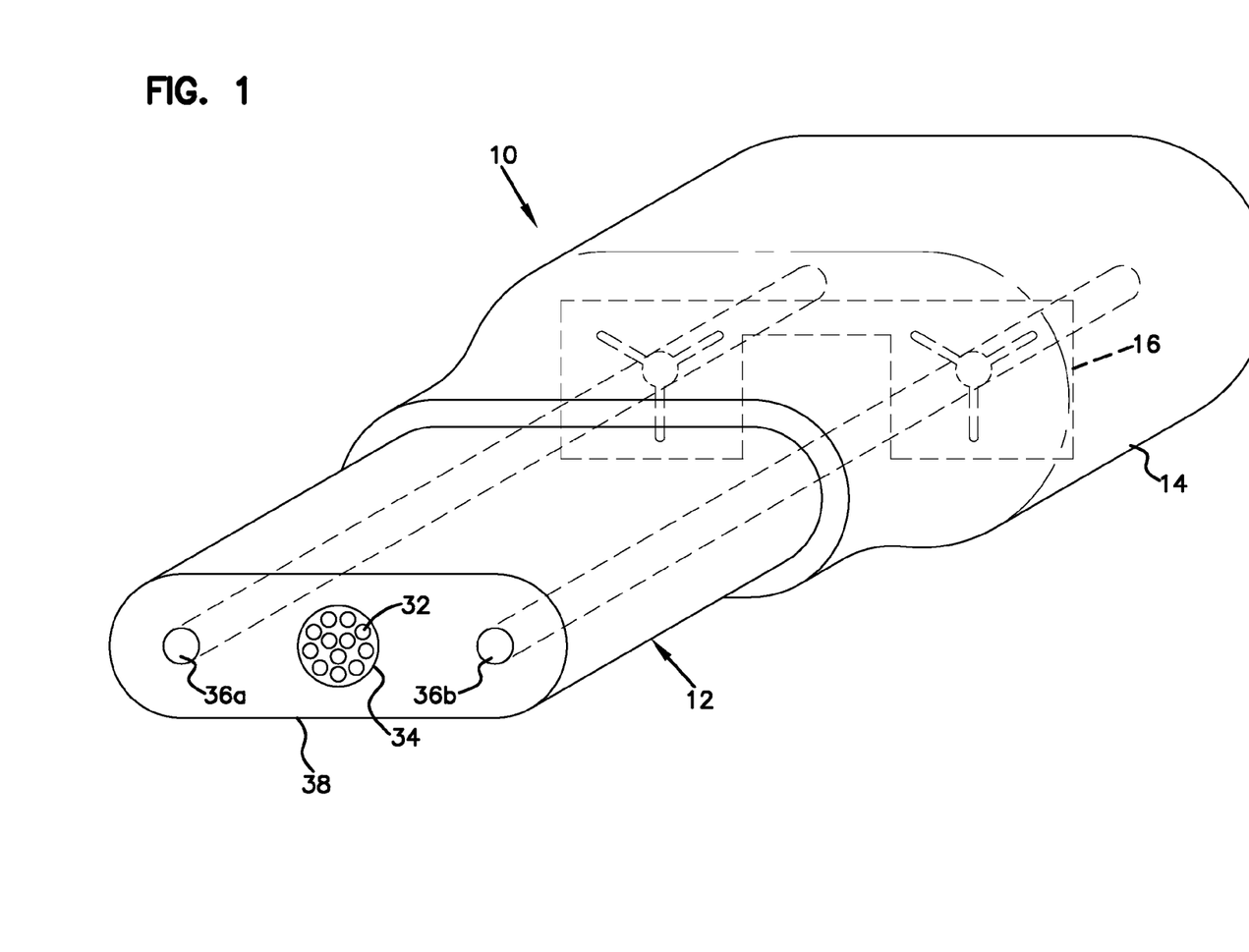
FIG. 1 is a perspective view of a fiber optic strain relief assembly having exemplary features of aspects in accordance with the principles of the present disclosure.
Figure 2:
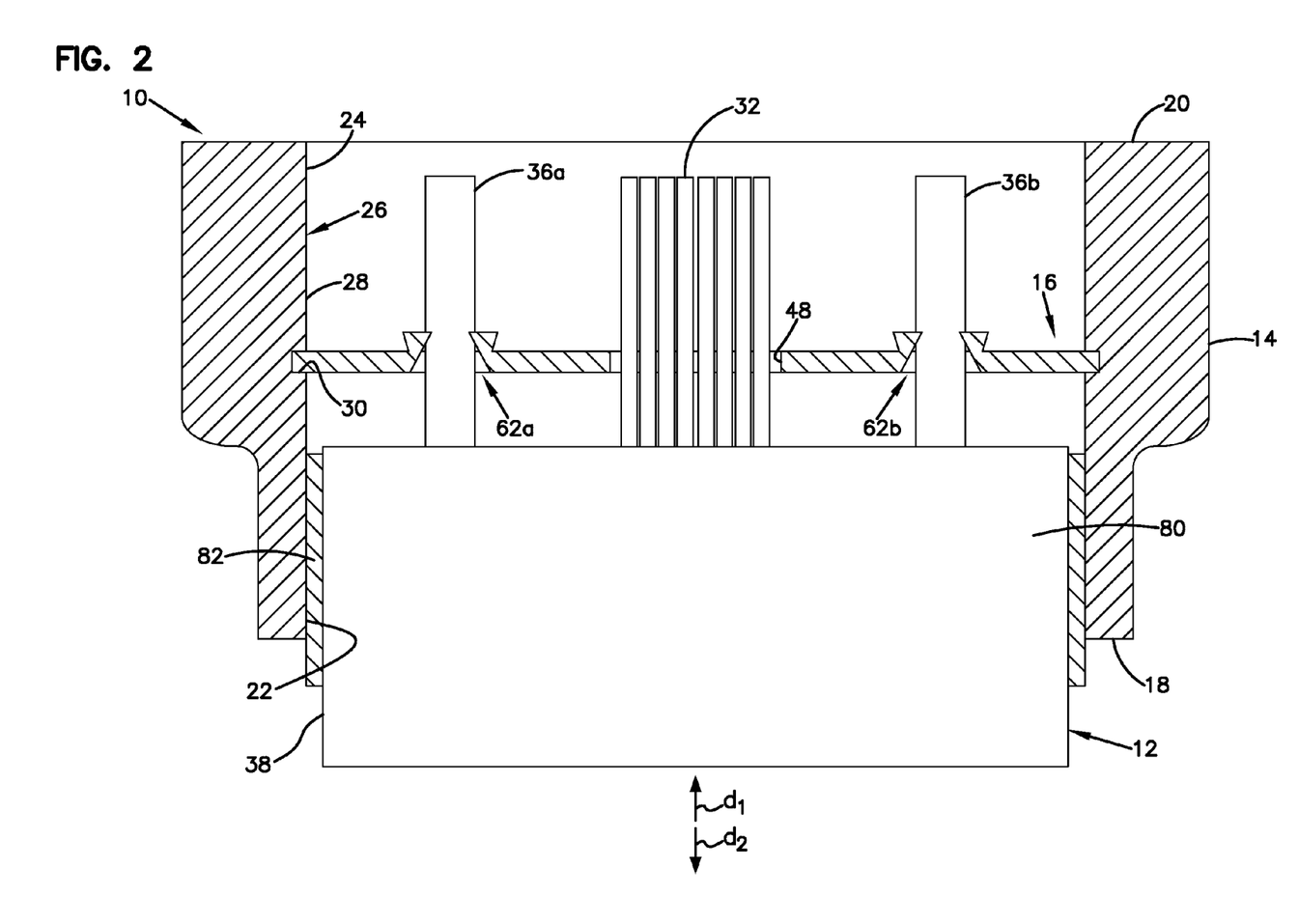
FIG. 2 is a cross-sectional view of the fiber optic strain relief assembly of FIG. 1.

Referring now to FIGS. 1 and 2, a fiber optic strain relief assembly, generally designated 10, is shown. In one aspect of the present disclosure, the fiber optic strain relief assembly 10 is adapted to receive a fiber optic cable 12 and to retain the fiber optic cable 12 in the fiber optic strain relief assembly 10. The fiber optic strain relief assembly 10 includes a housing, generally designated 14 and at least one strain relief plate, generally designated 16.

The housing 14 is adapted to receive at least a portion of the fiber optic cable 12 and to retain the portion of the fiber optic cable 12 in the housing 14. In one aspect of the present disclosure, the housing 14 is disposed at a cable entry location on a fiber optic enclosure, such as a drop terminal. In another aspect, the housing 14 is a connector housing that is engaged with a fiber optic connector. In another aspect, the housing 14 is an adapter housing that is adapted to receive connectorized ends of fiber optic cables.

In one aspect of the present disclosure, the housing 14 is generally rectangular in shape. In another aspect, the housing 14 is generally cylindrical in shape.

The housing 14 can be manufactured as a single component molded or alternatively from multiple components. For example, the housing 14 can include a first portion and a second portion where the first and second portions are engaged to form the housing 14. The housing 14 can be manufactured from a variety of plastic materials The housing 14 includes a first end 18 and an oppositely disposed second end 20. The first end 18 defines a first opening 22 while the second end 20 defines a second opening 24. A bore 26 provides a passageway between the first opening 22 and the second opening 24.

The bore 26 of the housing 14 is defined by an inner surface 28. The inner surface 28 defines a groove 30. In one aspect of the present disclosure, the groove 30 extends around the perimeter of the bore 26. In another aspect of the present disclosure, the groove 30 is disposed on opposite inside surfaces of the bore 26.

Referring now to FIG. 1, an exemplary embodiment of the fiber optic cable 12 is shown. In the depicted embodiment of FIG. 1, the fiber optic cable 12 is a multi-fiber fiber optic cable. The fiber optic cable 12 includes a plurality of optical fibers 32, a buffer tube 34, at least one strength member 36, and an outer jacket 38 that surrounds the strength member 36 and the buffer tube 34.

The buffer tube 34 encloses the plurality of optical fibers 32. In one aspect of the present disclosure, loose optical fibers 32 are disposed within the buffer tube 34. In another aspect of the present disclosure, ribbon fibers 32 are disposed within the buffer tube 34. In one aspect of the present disclosure, the buffer tube 34 may be gel filled.

In the subject embodiment, the strength member 36 is disposed outside of the buffer tube 34. The strength member 36 extends the length of the fiber optic cable 12. In one aspect of the present disclosure, the fiber optic cable 12 includes at least two strength members 36 that extend along opposite sides of the buffer tube 34.

The strength members 36 are shaped as rods. In one aspect of the present disclosure, the strength members 36 are flexible rods formed by glass fiber reinforced epoxy.

Figure 3:
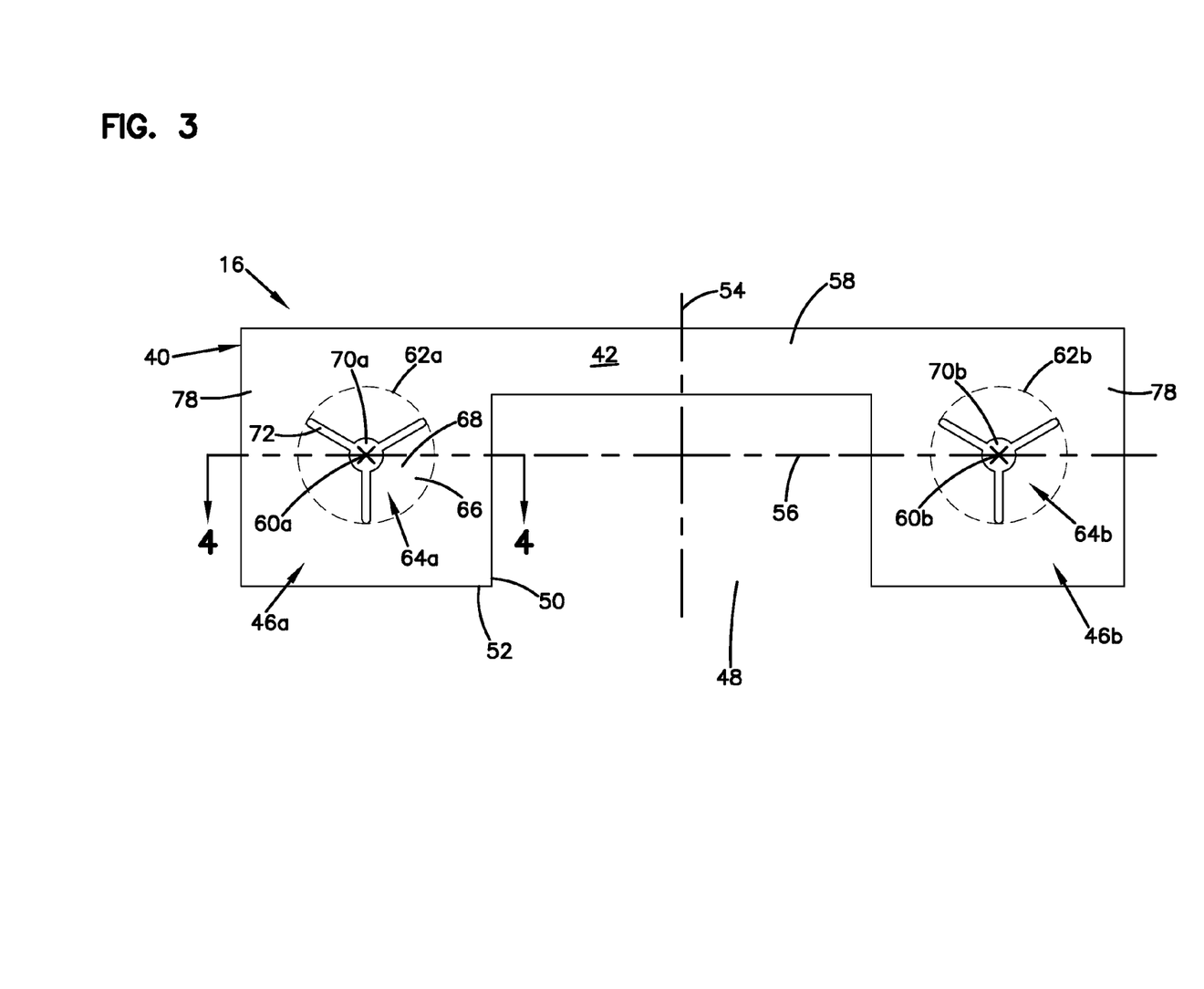
FIG. 3 is a front view of a strain relief plate suitable for use with the fiber optic strain relief assembly of FIG. 1.

Referring now to FIG. 3, the strain relief plate 16 is shown. The strain relief plate 16 includes a body 40 that is generally planar in shape. In one aspect of the present disclosure, the body 40 is manufactured from a metal material (e.g., spring steel, etc.). In another aspect, the body 40 is stamped.

Figure 4:
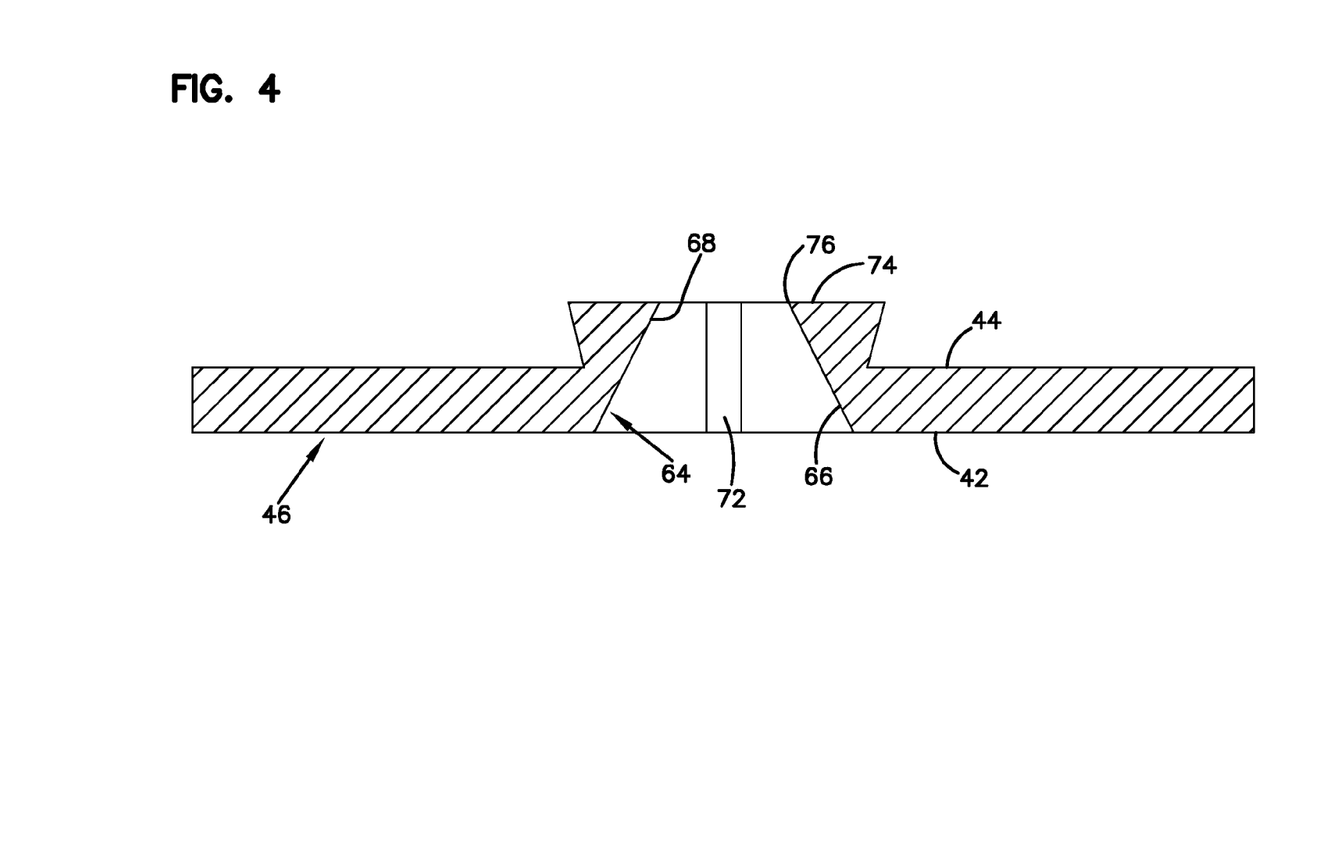
FIG. 4 is a cross-sectional view of a first retention portion of the strain relief plate taken on line 4-4 of FIG. 3.

The body 40 includes a first surface 42 and an oppositely disposed second surface 44 (shown in FIG. 4). The body 40 further includes at least one retention portion, generally designated 46. In the depicted example of FIG. 4, the body 40 includes a first retention portion 46a and a second retention portion 46b.

The body 40 defines a cable pass-thru portion 48. The cable pass-thru portion 48 is an opening in the body 40 that extends through the first and second surfaces 42, 44 of the body 40. The cable pass-thru portion 48 is adapted to receive the optical fibers 32 of the fiber optic cable 12. In one aspect of the present disclosure, the cable pass-thru portion 48 is a generally inverted U-shape passageway that includes an opening 50 in a longitudinal edge 52 of the body 40.

In one aspect of the present disclosure, the cable pass-thru portion 48 is disposed between the first and second retention portions 46a, 46b. In another aspect of the present disclosure, the cable pass-thru portion 48 of the body 40 is axisymmetric about an axis 54 that is perpendicular to a centrally disposed longitudinal axis 56 of the body 40.

The first retention portion 46a is joined to the second retention portion 46b by a crosspiece 58 that extends between the first and second retention portions 46a, 46b. In one aspect of the present disclosure, the crosspiece 58 is a thin band of material that connects the first and second retention portions 46a, 46b. In one aspect of the present disclosure, the crosspiece 58 is integral with the first and second retention portions 46a, 46b. In another aspect of the present disclosure, the crosspiece 58 is disposed adjacent to the cable pass-thru portion 48. In another aspect, the crosspiece 58 is disposed above the cable pass-thru portion 48.

The first retention portion 46a includes a first central axis 60a (shown as an "X" in FIG. 3) that is generally perpendicular to the first surface 42. The first central axis 60a is generally centrally located on the first retention portion 46a.

The second retention portion 46b includes a second central axis 60b (shown as an "X" in FIG. 3) that is generally perpendicular to the first surface 42. The second central axis 60b is generally centrally located on the second retention portion 46b.

The first surface 42 of the first retention portion 46a defines a first recess 62a generally aligned with the first central axis 60a while the first surface 42 of the second retention portion 46b defines a second recess 62b generally aligned with the second central axis 60b. The first surface 42 of each of the first and second recesses 62a, 62b is generally funnel shaped such that the diameter of each of the first and second recesses 62a, 62b decreases as the depth of each of the first and second recesses 62a, 62b increases.

The first recess 62a of the first retention portion 46a includes a first plurality of gripping tabs, generally designated 64a, while the second recess 62b second retention portion 46b includes a second plurality of gripping tabs, generally designated 64b. In one aspect of the present disclosure, each of the first and second plurality of gripping tabs 64a, 64b includes three gripping tabs 64 that are symmetrically disposed about the first and second central axes 60a, 60b, respectively.

Each of the gripping tabs 64 includes a base end 66 and an oppositely disposed free end 68. The base end 66 of each of the gripping tabs 64 is connected to the body 40. In one aspect of the present disclosure, the base end 66 is integrally connected to the body 40.

Figure 5:
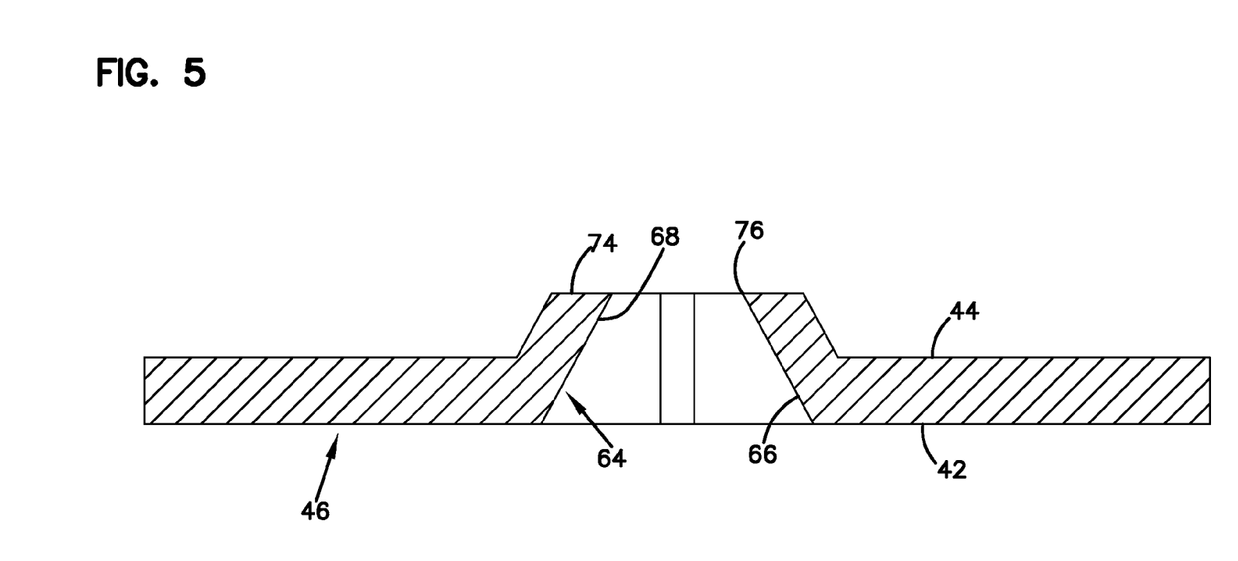
FIG. 5 is an alternate cross-sectional view of the first retention portion of the strain relief plate of FIG. 3.

Referring now to FIGS. 3 and 4, the free end 68 of each of the gripping tabs 64 extends beyond the second surface 44 of the body 40. In one example shown in FIG. 5, the portion of the second surface 44 coinciding with the free ends 68 of the gripping tabs 64 generally forms a frusto-conical surface extending outwardly from the portion of the second surface 44 coinciding with the body 40.

The free ends 68 of the first plurality of gripping tabs 64a define a first central opening 70a that is adapted to receive one of the strength members 36 of the fiber optic cable 12. The free ends 68 of the second plurality of gripping tabs 64b define a second central opening 70b that is adapted to receive the other of the strength members 36 of the fiber optic cable 12. Each of the first and second central openings 70a, 70b defines an inner diameter that is smaller than the outer diameter of the strength member 36.

Each of the free ends 68 of the first and second plurality of gripping tabs 64a, 64b are separated from adjacent free ends 68 by slots 72. The slots 72 radiate outwardly from the first and second central opening 70a, 70b and terminate at a location adjacent to the base ends 66 of the gripping tabs 64.

Each of the free ends 68 of the first and second plurality of gripping tabs 64a, 64b includes an end surface 74. The end surface 74 includes an inner edge 76 disposed at the interface between the end surface 74 and the first surface 42. The inner edge 76 is adapted to engage the strength member 36.

The body 40 defines an edge portion 78. The edge portion 78 is disposed about an outer periphery of the body 40. The edge portion 78 is adapted for insertion into the groove 30. With the edge portion 78 inserted into the groove 30, the strain relief plate 16 is retained in the housing 14.

Referring now to FIGS. 2 and 3, use of the fiber optic strain relief assembly 10 to secure the fiber optic cable 12 will be described. A portion of the outer jacket 38 of an end 80 of the fiber optic cable 12 is removed. With the outer jacket 38 removed, the strength members 36 and the buffer tube 34 housing the optical fibers 32 are exposed. In one aspect of the present disclosure, the buffer tube 34 is removed to expose the optical fibers 32 within the buffer tube 34.

The end 80 of the fiber optic cable 12 is inserted into the first opening 22 of the first end 18 of the housing 14 in an insertion direction $d_1$ (shown as an arrow in FIG. 2). In one aspect of the present disclosure, an adhesive 82 is applied to a portion of the outer jacket 38 of the end 80 of the fiber optic cable 12. The adhesive 82 is adapted to bond to the outer jacket 38 of the fiber optic cable 12 and to the first end 18 of the housing 14. This adhesive bonding improves the retention strength of the fiber optic strain relief assembly 10.

The optical fibers 32 of the fiber optic cable 12 are routed though the bore 26 of the housing 14. Once in the bore 26 of the housing 14, the optical fibers 32 of the fiber optic cable 12 are routed through the cable pass-thru portion 48 of the strain relief plate 16.

As the optical fibers 32 of the fiber optic cable 12 pass through the cable pass-thru portion 48 of the strain relief plate 16, the first strength member 36a of the fiber optic cable 12 passes through the first central opening 70a of the first retention portion 46a while the second strength member 36b of the fiber optic cable 12 passes through the second central opening 70b of the second retention portion 46b. In one aspect of the present disclosure, the first and second strength members 36a, 36b are coated with an adhesive before the first and second strength members 36a, 36b are inserted into the housing 14.

The funnel-shaped first and second recesses 62a, 62b of the first and second retention portions 46a, 46b, respectively, guide the first and second strength members 36a, 36b through the first and second central openings 70a, 70b. As the outer diameter of the first and second strength members 36a, 36b is larger than the first and second central openings 70a, 70b of the first and second retention portions 46a, 46b, respectively, the gripping tabs 64 of the first and second plurality of gripping tabs 64a, 64b flex outwardly as the first and second strength members 36a, 36b are pushed through the strain relief plate 16. As the first and second strength members 36a, 36b are pushed through the strain relief plate 16, the free ends 68 of the first and second plurality of gripping tabs 64a, 64b flex outwardly from the first and second central axes 60a, 60b, respectively, of the first and second retention portions 46a, 46b.

The resiliency of the gripping tabs 64 causes the free ends 68 of the first and second plurality of gripping tabs 64a, 64b to exert a radial force against the first and second strength members 36a, 36b, respectively. This radial force results in the inner edge 76 of each of the free ends 68 of the first and second plurality of gripping tabs 64a, 64b engaging the outer surfaces of the first and second strength members 36a, 36b, respectively. In one aspect of the present disclosure, the radial force results in the inner edges 76 embedding or digging into the outer surfaces of the first and second strength members 36a, 36b.

With the strength members 36 disposed in the first and second central openings 70a, 70b of the strain relief plate 16, the fiber optic cable 12 is secured to the housing 14. Since the inner edges 76 of the free ends 68 of the first and second plurality of gripping tabs 64a, 64b are embedded in the outer surfaces of the first and second strength members 36a, 36b, a pull-out force applied to the fiber optic cable 12 in a removal direction $d_2$, which is in a direction opposite from the insertion direction $d_1$, causes the free ends 68 of the first and second plurality of gripping tabs 64a, 64b to flex inwardly toward the first and second central axes 60a, 60b, respectively. As the free ends 68 flex inwardly, the radial force acting against the first and second strength members 36a, 36b increases thereby resisting the pull-out force. In one aspect of the present disclosure, as the free ends 68 of the first and second plurality of gripping tabs 64a, 64b flex further inwardly, the free ends 68 embed further into the outer surfaces of the first and second strength members 36a, 36b, which increases resistance to the pull-out force. In one aspect of the present disclosure, the strain relief plate 16 enables the fiber optic cable 12 to withstand cable flexure forces and sheath retention forces per Telecordia GR-771-CORE.

Figure 6:
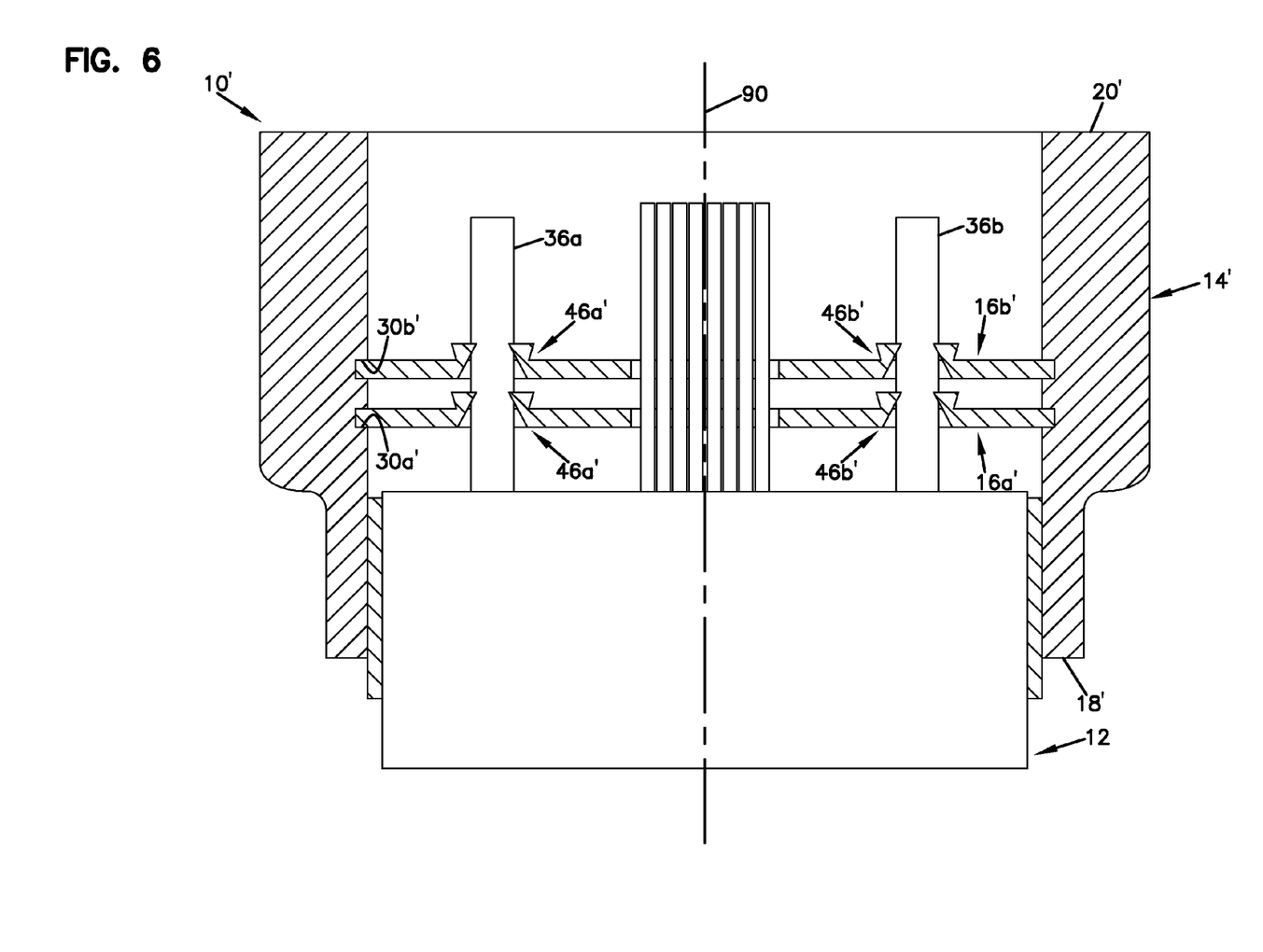
FIG. 6 is a cross-sectional view of an alternate embodiment of the fiber optic strain relief assembly of FIG. 1.

Referring now to FIG. 6, an alternate embodiment of a fiber optic strain relief assembly 10' is shown. In this alternate embodiment, the fiber optic strain relief assembly 10' includes a housing 14', a first strain relief plate 16a' and a second strain relief plate 16b'. The housing 14' includes a first groove 30a' and a second groove 30b'. In one aspect of the present disclosure, the second groove 30b' is axially offset from the first groove 30a' along a longitudinal axis 90 that extends from a first end 18' of the housing 14' to a second end 20' of the housing 14'. In another aspect of the present disclosure, the second groove 30b' is disposed between the first groove 30a' and the second end 20' of the housing 14'.

The first and second strain relief plates 16a', 16b' are disposed in the first and second grooves 30a', 30b', respectively. Each of the first and second strain relief plates 16a', 16b' includes first and second retention portions 46a', 46b' that are adapted to receive and retain first and second strength members 36a, 36b of the fiber optic cable 12. In one aspect of the present disclosure, the first retention portions 46a' of the first and second strain relief plates 16a', 16b' are axially aligned within the housing 14' such that the first strength member 36a extends through the first retention portions 46a' of the first and second strain relief plates 16a', 16b'. The second retention portion 46b' of the first and second strain relief plate 16a', 16b' are axially aligned within the housing 14' such that the second strength member 36b extends through the second retention portions 46b' of the first and second strain relief plates 16a', 16b'.

The inclusion of first and second strain relief plates 16a', 16b' in the housing 14' of the fiber optic strain relief assembly 10' is potentially advantageous as it increases the retention strength of the fiber optic strain relief assembly 10' on the fiber optic cable 12.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A fiber optic strain relief assembly comprising:
   a housing having a first end and an oppositely disposed second end, the housing defining a bore that extends between the first end and the second end; and
   a strain relief plate disposed in the bore of the housing, the strain relief plate including a retention portion that is adapted to receive a strength member of a fiber optic cable, wherein the retention portion includes a plurality of resilient gripping tabs adapted to engage an outer surface of the strength member.

2. The fiber optic strain relief assembly of claim 1, wherein the strain relief plate defines a cable pass-thru portion adapted to receive an optical fiber of the fiber optic cable.

3. The fiber optic strain relief assembly of claim 1, wherein the strain relief plate includes a first retention portion and a second retention portion.

4. The fiber optic strain relief assembly of claim 3, wherein the strain relief plate includes a cable pass-thru portion disposed between the first and second retention portions.

5. The fiber optic strain relief assembly of claim 1, wherein each of plurality of gripping tabs includes a base end and an oppositely disposed free end, the base end being connected to a body of the strain relief plate.

6. The fiber optic strain relief assembly of claim 1, wherein the plurality of gripping tabs define a central opening that is adapted to receive the strength member.

7. The fiber optic strain relief assembly of claim 1, wherein the plurality of gripping tabs includes a first surface that is generally funnel-shaped.

8. The fiber optic strain relief assembly of claim 1, wherein the strain relief plate is engaged in a groove in the bore of the housing.

9. A fiber optic strain relief assembly comprising:
a fiber optic cable including a first strength member and a second strength member;
a housing having a first end and an oppositely disposed second end, the housing defining a bore that extends between the first end and the second end, wherein the first end receives an end of the fiber optic cable; and
a strain relief plate disposed in the bore of the housing, the strain relief plate including:
a first retention portion and a second retention portion, each of the first and second retention portions including a plurality of gripping tabs that defines a central opening, each of the central openings being adapted to receive one of the first and second strength members of the fiber optic cable;
a cable pass-thru portion disposed between the first and second retention portions, the cable pass-thru portion being adapted to receive an optical fiber of the fiber optic cable.

10. The fiber optic strain relief assembly of claim 9, wherein each of the plurality of gripping tabs includes a base end and an oppositely disposed free end.

11. The fiber optic strain relief assembly of claim 9, wherein the strain relief plate further includes a crosspiece that joins the first retention portion to the second retention portion.

12. The fiber optic strain relief assembly of claim 9, wherein the strain relief plate is made of a spring steel material.

13. The fiber optic strain relief assembly of claim 9, wherein a second strain relief plate is disposed in the bore of the housing such that the second strain relief plate is axially offset from the strain relief plate.

14. The fiber optic strain relief assembly of claim 13, wherein the second strain relief plate includes a first retention portion and a second retention portion, each of the first and second retention portions defining a central opening that is axially aligned with the central opening of the corresponding first and second retention portions of the strain relief plate.

15. The fiber optic strain relief assembly of claim 9, wherein the first retention portion defines a first recess and the second retention portion defines a second recess, the first and second recesses being adapted to guide the first and second strength members to the central openings of the first and second retention portions.

16. The fiber optic strain relief assembly of claim 15, wherein the first and second recesses are generally funnel-shaped.

17. The fiber optic strain relief assembly of claim 9, wherein the first and second strength members are flexible rods formed by glass fiber reinforced epoxy.

18. A method for inserting a fiber optic cable into a fiber optic strain relief assembly, the method comprising:
stripping an outer jacket of a fiber optic cable from an end of the fiber optic cable;
inserting a strength member of the fiber optic cable through a first end of a housing of a fiber optic strain relief assembly; and
inserting the strength member through an opening of a retention portion of a strain relief plate of the fiber optic strain relief assembly.

19. The method of claim 18, further comprising inserting an optical fiber of the fiber optic cable through a cable pass-thru portion of the strain relief plate.

20. The method of claim 18, further comprising inserting the strength member of the fiber optic cable through an opening of a retention portion of a second strain relief plate of the fiber optic strain relief assembly.

21. The method of claim 20, wherein the second strain relief plate is axially offset from the first strain relief plate.

22. The method of claim 18, wherein a portion of the strength member that is inserted through the opening of the retention portion is coated with adhesive.

\* \* \* \* \*